W. KANE.
AUTOMATIC GAS REGULATOR.
APPLICATION FILED MAY 15, 1920.
1,384,323.
Patented July 12, 1921.
2 SHEETS—SHEET 2.
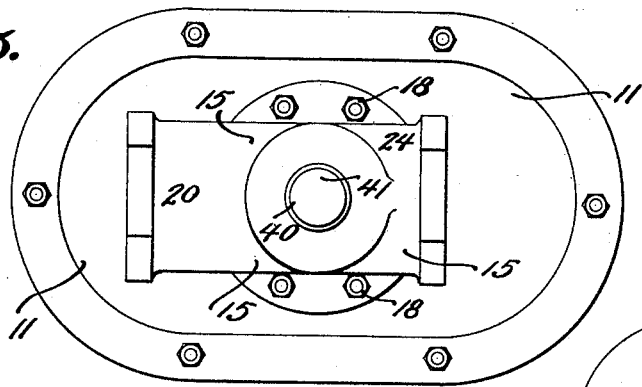
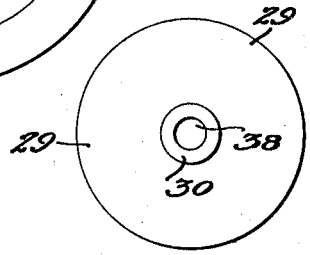
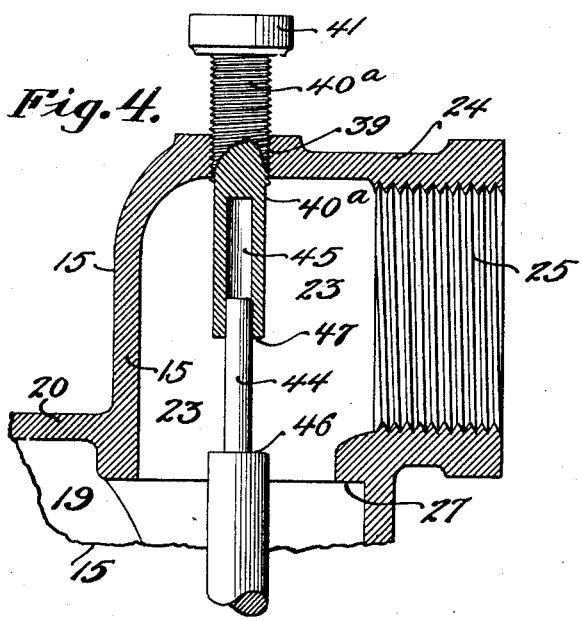
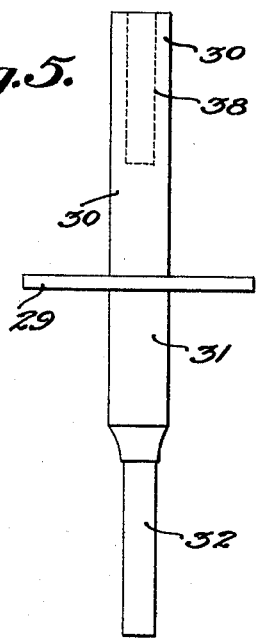
Witnesses
Geo. A. Gruss
Augustus B. Copper
Inventor
William Kane
By Joshua R. H. Potts
his Attorney

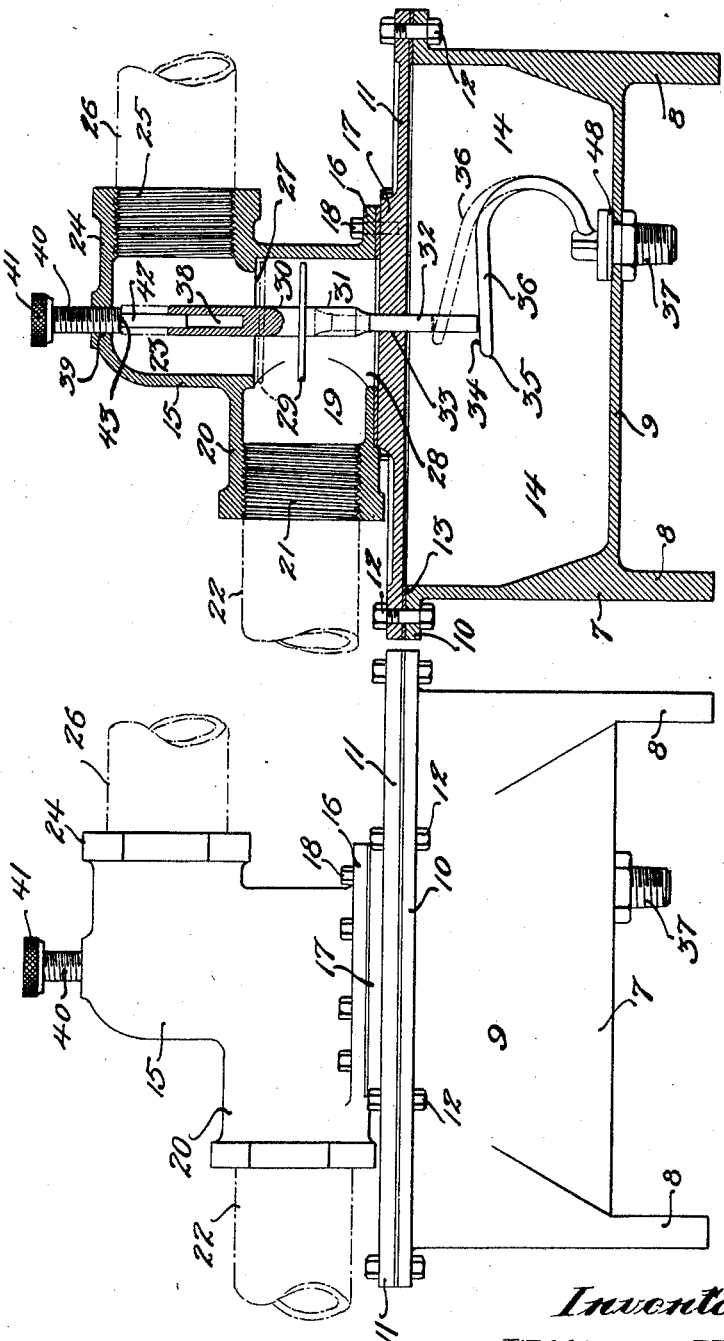

UNITED STATES PATENT OFFICE.

WILLIAM KANE, OF PHILADELPHIA, PENNSYLVANIA.

AUTOMATIC GAS-REGULATOR.

1,384,323.

Specification of Letters Patent.  Patented July 12, 1921.

Application filed May 15, 1920. Serial No. 381,602.

*To all whom it may concern:*

Be it known that I, WILLIAM KANE, a citizen of the United States, residing at Philadelphia, in the county of Philadelphia and State of Pennsylvania, have invented certain new and useful Improvements in Automatic Gas-Regulators, of which the following is a specification.

One object of my present invention is to provide an improved regulating device of a simple, practical and durable construction which can be used in connection with numerous appliances and which will automatically operate in a dependable manner to vary the supply of gas fuel to a burner so that the burner will be supplied a desired and proper amount of fuel to suit various requirements. In view of the above mentioned qualifications, my improved gas regulator can be used advantageously in connection with a steam generating apparatus for vulcanizing or it can be used for numerous other purposes, such for example when it is necessary and desirable to maintain uniform pressure of steam and when thus used will operate automatically, due to the pressure of the steam generated, to keep the steam at a desired uniform pressure.

Another object of my invention is to so make my regulator that it can be quickly and easily manufactured and installed.

A further object is to provide means of simple and novel construction in my improved regulator which can be easily and quickly adjusted in a convenient manner so as to control the amount of gas passing through the valve to suit different requirements.

Another object is to so construct and arrange the parts of my improved gas regulator that access may be easily and quickly had to any of said parts if such access is necessary for repair, adjustment or replacement thereof.

These objects, and other advantageous ends which will be described hereinafter, I attain in the following manner, reference being had to the accompanying drawings, in which—

Figure 1 is a front elevation of an automatically operative gas regulator made in accordance with my present invention, Fig. 2 is a central longitudinal section of Fig. 1, Fig. 3 is a top plan view of Fig. 1, Fig. 4 is an enlarged fragmentary section of a part of my improved gas regulator showing certain of the features thereof, in a modified form, Fig. 5 is an enlarged elevation of a valve and valve stem which forms a part of my invention, and Fig. 6 is a top plan view of Fig. 5.

Referring to the drawings, 7 represents a hollow pedestal which is preferably made of cast metal and which includes supporting legs 8 depending below the bottom of the hollow body portion 9. The hollow pedestal 7 is preferably made elongated of the shape clearly illustrated in Figs. 1, 2 and 3 and the top of the hollow body portion has an annularly extending flange 10 to which is bolted or otherwise suitably secured a top or cover plate 11. In the present instance I have illustrated bolts 12 securing the cover plate to the flange 10 of the pedestal 7; there being a gasket 13 of any suitable material interposed between the top of the flange 10 and the bottom of the cover plate 11 so as to provide a sealed chamber 14 within the body portion as clearly shown in Fig. 2.

A valve casing 15 has a flanged base 16 which is secured to the top of a boss 17 formed on the upper surface of the cover plate 11 and in the present instance I have illustrated angularly headed screws 18 for this purpose. The valve casing 15 has a lower compartment 19 formed therein; said lower compartment communicating with the interior of a laterally projecting pipe-connecting extension 20; the latter being screw threaded as shown at 21 to permit a gas inlet pipe 22 to be screwed therein; said inlet pipe being shown in dotted lines in Figs. 1 and 2. A second compartment 23 is provided in the casing 15 above the compartment 19 and this compartment 23 communicates with the interior of a laterally projecting pipe-connecting extension 24; the latter having a screw threaded opening 25 into which a gas outlet pipe 26 can be screwed; said outlet pipe being illustrated in dotted lines in Figs. 1 and 2. The upper inner portion of the compartment 19 communicates with the lower inner portion of the compartment 23 and at the junction of the compartments 19 and 23 I provide an annular ledge or shoulder 27; said ledge or shoulder facing downwardly as clearly shown in Figs. 2 and 4.

The valve casing 15 has an opening 28 in its bottom which communicates with the compartment 19 and is located directly under the ledge or shoulder 27. A disk valve 29 is located within the compartment 19 and is adapted to be inserted therein through the opening 28. This disk valve is of greater diameter than the communicating portion of the compartment 23 with the compartment 19. In other words, if the disk valve were moved into engagement with the under ledge or shoulder 27, said disk valve would cut off communication between the compartments 19 and 23. The disk valve has a stem connected centrally thereto; a portion 30 of said stem projecting upwardly from the disk valve into the compartment 23 while the lower portion 31 of said valve stem depends from the disk valve and has a part 32 of reduced diameter which is adapted to freely but snugly slide in a vertical direction through a hole 33 in the top plate 11 of the pedestal 7. The lower end of the part 32 of the valve stem depends into the sealed chamber 14 and is adapted to rest upon the upper surface 34, adjacent the closed end 35, of a bent flexible tube 36; said tube being of the shape clearly shown in Fig. 2. The tube 36 is located within the sealed chamber 14 and has a threaded nipple connection 37 extending through a hole in the bottom of the hollow body portion 9. This nipple connection permits the attachment of a steam pipe (not illustrated) which for example may lead from a steam boiler or generator for supplying steam to a vulcanizing apparatus or other apparatus to which it is desired to supply steam at a uniform pressure.

The upper portion 30 of the valve stem has a bore 38 which extends downwardly from its top as clearly shown in Figs. 2, 5 and 6. The top portion of the valve casing 15 has a screw threaded hole 39 in which fits an adjusting screw 40; said screw having a head 41 which is preferably knurled so as to be easily turned by the fingers. The lower end of the adjusting screw has a cylindrical rod portion 42 which depends into the compartment 23 and slidably fits within the valve stem bore 38. The rod portion 42 is of smaller diameter than the screw threaded portion of the adjusting screw and the intersection of the rod portion of the adjusting screw and the intersection of the rod portion with the screw threaded portion provides a lower shoulder 43 which is adapted to be abutted by the top end of the valve stem during the operation of the device as will be described hereinafter. It will be noted that the adjusting screw, valve stem, valve and hole 33 are in axial or straight alinement with each other so that the valve stem will be smoothly movable upwardly and downwardly on the rod portion 42.

In the operation of my device, considering that the pipe 26 is supplying gas to a burner for generating steam and that a portion of said steam is conveyed into the tube 36 through the medium of the nipple connection 37, when the steam attempts to increase beyond a predetermined pressure, the free bent portion of the tube 36 will tend to move upwardly or to straighten out and in so doing the valve stem will be raised and the valve 29 will be moved toward the ledge or shoulder 27; thereby restricting or reducing the amount of gas passing into the compartment 23 from the compartment 19; it being noted that the pipe 22 is adapted to convey gas into the compartment 19. In this manner the amount of gas fuel which is supplied to the burner will vary automatically and the steam will obviously be kept at a uniform pressure. The upward movement of the valve can be limited by turning the adjusting screw 40 to change the position of the shoulder 43 and in this manner the extreme upward movement of the valve can be varied to insure a proper by-pass of the gas at all times and prevent gas from being entirely cut off from the burner if an increase of pressure should develop to such extent that it would entirely close the valve if the shoulder 43 were not present to stop the movement of the valve before the latter entirely closed. In other words, it is possible with the adjusting means as above described to positively stop the upward movement of the disk valve at any desired position. In Fig. 2 the normal position of the parts is shown in full lines and a dot-and-dash line position is also illustrated to show the valve having been moved into such position that the top of the valve stem abuts the shoulder 43 of the adjusting screw and thereby stops the movement of the valve before the latter has quite reached the annular ledge or shoulder 27. The telescopic connection between the valve stem and the adjusting screw and the arrangement of the guide hole 33 provides the free and smooth movement above referred to and the valve stem can be freely moved out of the casing 15 when the latter is detached from the pedestal. The adjusting screw 40 can also be either quickly removed or inserted and in construction there are no complicated parts which require tedious operations in order to remove them from their operative positions. In Fig. 4, I have shown a slight modification illustrating a reversal of parts in telescopic connection between the valve stem and the adjusting screw and in this instance the rod portion provides a part of the valve stem as shown at 44 and this rod portion freely slides within a bore 45 in the adjusting screw 40$^a$. The rod portion 44 is of reduced diameter so as to provide a shoulder 46 adapted to abut the lower end or shoulder 47 of the adjusting screw 40$^a$. In all other respects the parts shown in Fig. 4 are similarly described in connection with the remaining figures of drawing and I have therefore given corresponding parts similar reference characters.

The pedestal 7 in addition to forming a support for the valve casing and for the tube 36 provides the sealed chamber 14 so that if any gas should leak through the guide hole 33, this gas will be confined within said chamber 14 and prevent further escape. It will be noted that a sealing gasket 48 is preferably provided at the threaded nipple connection for the steam pipe so that leakage of gas at this point is also prevented.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A regulator of the character described including a valve casing having two communicating compartments with a downwardly facing ledge surrounding the communicating portions of said compartments, said casing having a screw threaded hole extending therethrough; an adjusting screw fitting said hole and having a portion in slidable connection with said valve; and means automatically movable to different extents due to variation in fluid pressure and adapted to move said valve toward said ledge, said adjusting screw having a connected portion for abutment with a part of said valve to limit its sliding movement toward said ledge; substantially as described.

2. A regulator of the character described including a valve casing having two communicating compartments and a portion providing a ledge surrounding the communicating portions of said compartments; a valve movable toward and from said ledge, said valve having a stem; an adjusting screw in screw threaded connection with said valve casing and having a portion in sliding connection with said valve stem; and means automatically movable to different extents due to variation in fluid pressure and adapted to move said valve toward said ledge; substantially as described.

3. A regulator of the character described including a valve casing having two communicating compartments, one compartment having a portion below the other and a portion providing a ledge surrounding the communicating portions of said compartments; a valve movable toward and from said ledge; means automatically movable to different extents due to variation in fluid pressure and adapted to move said valve toward said ledge, said valve having a stem; and an adjusting screw in screw threaded connection with said valve casing and having a portion outside of said casing and an inner portion in sliding connection with said valve whereby the valve is smoothly guided toward and from said edge; substantially as described.

4. A regulator of the character described including a valve casing having two communicating compartments, one compartment having a portion below the other and a portion providing a ledge surrounding the communicating portions of said compartments; a valve movable toward and from said ledge, said valve having a stem providing portions extending upwardly and downwardly therefrom; an adjusting screw fitting said casing and having a part depending into the upper compartment in sliding connection with the upper portion of said valve stem and an operative part outside of said casing; means at the bottom of said casing providing a hole through which the lower portion of said valve stem slides; and means automatically movable to different extents due to variation in fluid pressure and adapted to move upwardly said lower portion of the valve stem whereby the valve is moved toward said ledge; substantially as described.

5. A regulator of the character described including a valve casing having two communicating compartments, one compartment having a portion below the other and a portion providing a ledge surrounding the communicating portions of said compartments; a valve movable toward and from said ledge, said valve having a stem providing portions extending upwardly and downwardly therefrom; an adjusting screw fitting said casing and having a part depending into the upper compartment in sliding connection with the upper portion of said valve stem; a hollow pedestal having a sealed chamber and providing a top forming a support for said valve casing, said top having a hole therein through which the lower portion of said valve stem slides; and means in said chamber automatically movable to different extents due to variation in fluid pressure and adapted to engage and move upwardly said lower portion of the valve stem whereby the valve is moved toward said ledge; substantially as described.

6. A regulator of the character described including a valve casing having two compartments, one below the other and a downwardly facing ledge surrounding the communicating portions of said compartments; a valve in the lower compartment having a stem projecting upwardly and downwardly therefrom, said casing having a screw threaded hole in its top; an adjusting screw fitting said hole and having a portion depending into the upper compartment and in slidable connection with the upper part of said valve stem; means at the bottom of said valve casing providing a hole through which the lower part of said valve stem slides; and means automatically movable to different extents due to variation in fluid pressure and adapted to move said valve toward said ledge; substantially as described.

7. A regulator of the character described including a valve casing having two compartments, one below the other and a downwardly facing ledge surrounding the communicating portions of said compartments; a valve in the lower compartment having a stem projecting upwardly and downwardly therefrom, said casing having a screw threaded hole in its top; an adjusting screw fitting said hole and having a portion depending into the upper compartment and in slidable connection with the upper part of said valve stem; means at the bottom of said valve casing providing a hole through which the lower part of said valve stem slides; and means automatically movable to different extents due to variation in fluid pressure and adapted to move said valve toward said ledge, said adjusting screw having a portion for abutment with a portion of said valve whereby the upward movement of said valve may be accurately limited to different extents by turning said screw; substantially as described.

8. A regulator of the character described including a valve casing having two communicating compartments with a ledge surrounding the communicating portions of the compartments; a valve movable toward and from said ledge, said valve having a stem with a part extending downwardly therefrom; a hollow supporting pedestal having a sealed chamber and providing a top forming a support for said valve casing and a closure for one of said compartments below the edge, said top having a hole therein through which the lower part of said stem slides; and means in said chamber automatically movable to different extents due to variation in fluid pressure and adapted to engage and move upwardly said lower portion of the valve stem whereby the valve is moved toward said ledge; substantially as described.

In testimony whereof I have signed my name to this specification in the presence of two subscribing witnesses.

WILLIAM KANE

Witnesses:
CHAS. E. POTTS,
AUGUSTUS B. COPPES.